April 16, 1946.   J. A. PAASCHE   2,398,503
FLUID PRESSURE REGULATOR
Filed Feb. 20, 1943   2 Sheets-Sheet 1
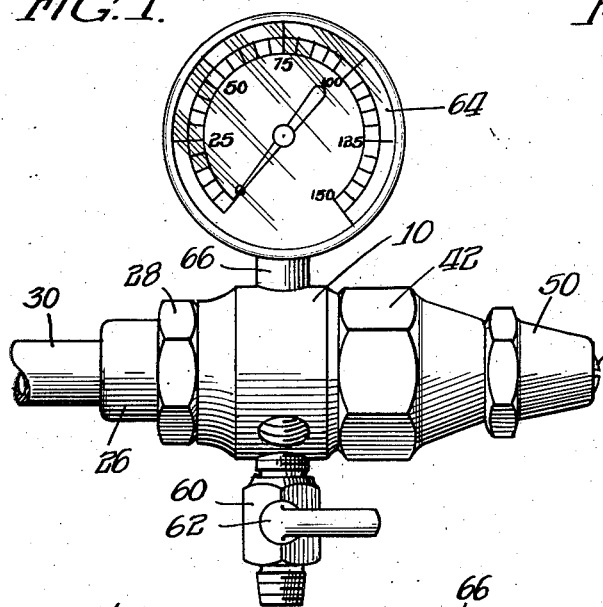
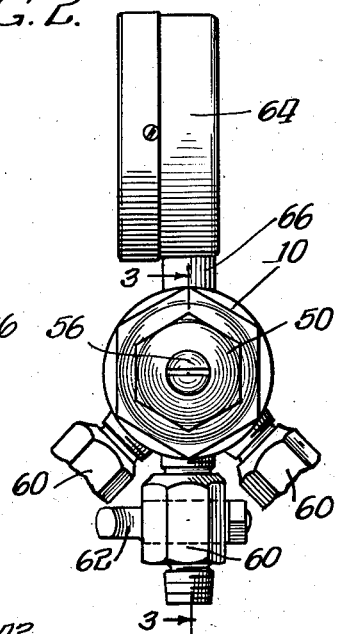
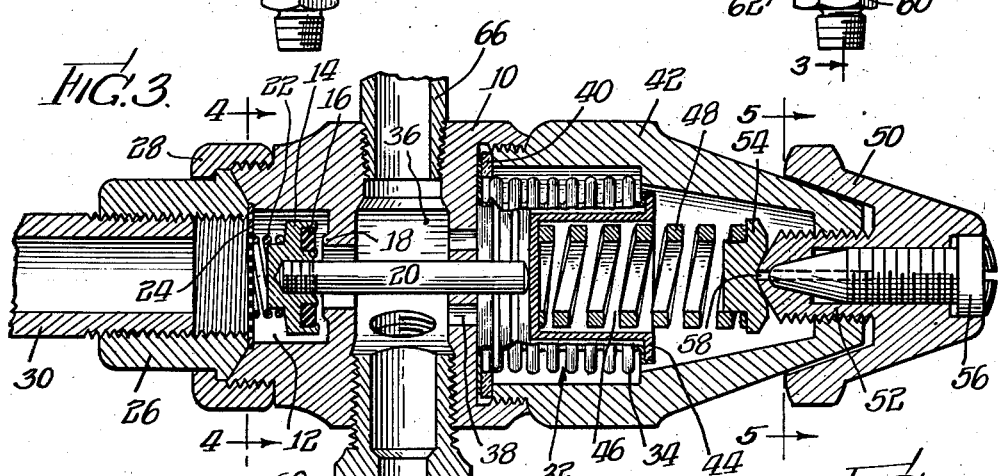
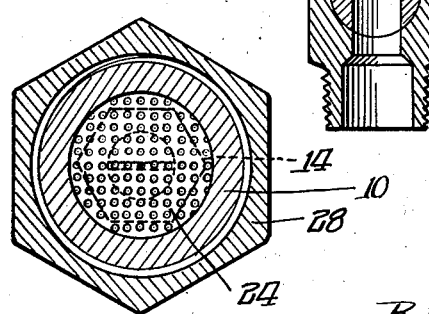
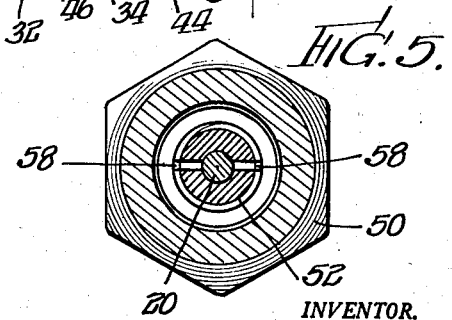
INVENTOR.
Jens A. Paasche April 16, 1946.   J. A. PAASCHE   2,398,503
FLUID PRESSURE REGULATOR
Filed Feb. 20, 1943   2 Sheets-Sheet 2

INVENTOR.
Jens A. Paasche
BY:
Loftus, Moore, Olson & Trexler
attys.

Patented Apr. 16, 1946

2,398,503

UNITED STATES PATENT OFFICE 2,398,503

FLUID PRESSURE REGULATOR

Jens A. Paasche, Chicago, Ill.

Application February 20, 1943, Serial No. 476,605

1 Claim. (Cl. 50—23)

This invention relates generally to fluid or air pressure regulating devices and more particularly to air pressure regulators adapted for use with air painting equipment and the like.

In the use of spray or air painting equipment precise regulation of air pressure is essential to provide perfect atomization of material and to insure uniform application. The present invention contemplates an air regulator which is adapted to reduce and precisely control air line pressure to any desired volume. In order to adapt a pressure line for various air operated tools, air motors, pneumatic cylinders and the like, a relatively wide range of pressures must be available. It is therefore one of the important objects of the present invention to provide an air pressure regulator which will adapt a given air line pressure to be used for air operated devices which require different air pressure values to insure efficient operation.

More specifically, the present invention contemplates an air or fluid pressure regulator of relatively high capacity, which is very compact, small in size and of relatively light weight.

It is another object of the present invention to provide an air pressure regulator as set forth above from which the accumulation of rust, scale and the like may be very easily removed and to this end it is proposed to provide a strainer arrangement of improved practical design as an integral part of the regulator.

Still more specifically, the invention contemplates an air pressure regulator of the type set forth above in which pressure responsive means, as for example, a pressure responsive bellows, requires relatively slight movement and yet is capable of greater air volume capacity than air pressure devices heretofore employed in association with spraying or air painting equipment.

Another object of the present invention is to provide in association with air pressure regulating devices, improved valve adjusting and locking means of built-in type and as such is particularly adapted to withstand severest operating conditions incident to the normal use thereof in association with spraying equipment and the like.

Other objects and advantages will be apparent from the following detailed description when considered in connection with the accompanying drawings, wherein—

Fig. 1 is a side elevational view of an air or fluid pressure regulator of the type contemplated by the present invention;

Fig. 2 is an elevational view taken from the right of Fig. 1;

Fig. 3 is an enlarged central sectional view of the device shown in Figs. 1 and 2, said section being taken substantially along the line 3—3 of Fig. 2;

Fig. 4 is a transverse sectional view taken substantially along the line 4—4 of Fig. 3 to more clearly illustrate the structural characteristics of the strainer;

Fig. 5 is a cross-sectional view taken substantially along the line 5—5 of Fig. 3;

Figure 6:
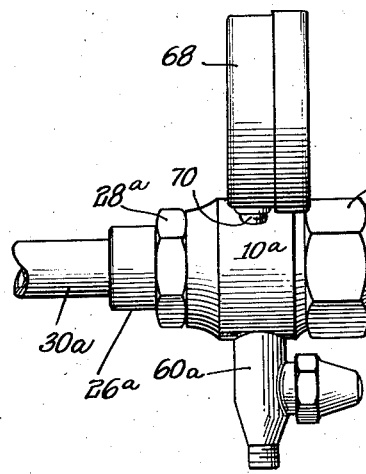
Fig. 6 is a side elevational view similar to Fig. 1 of a fluid pressure regulator of slightly modified form.
Figure 7:
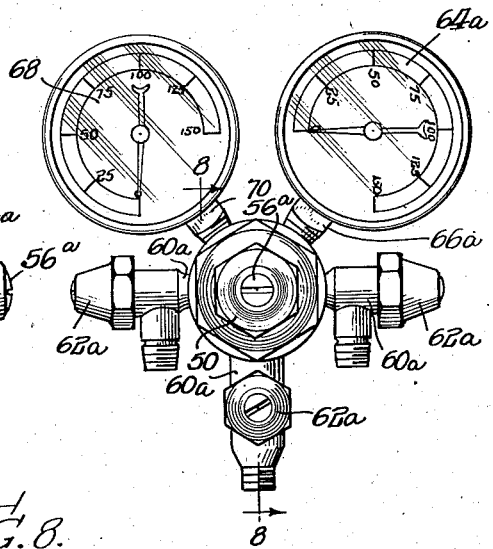
Fig. 7 is an elevational view of the modified regulator design as taken from the right of Fig. 6.
Figure 8:
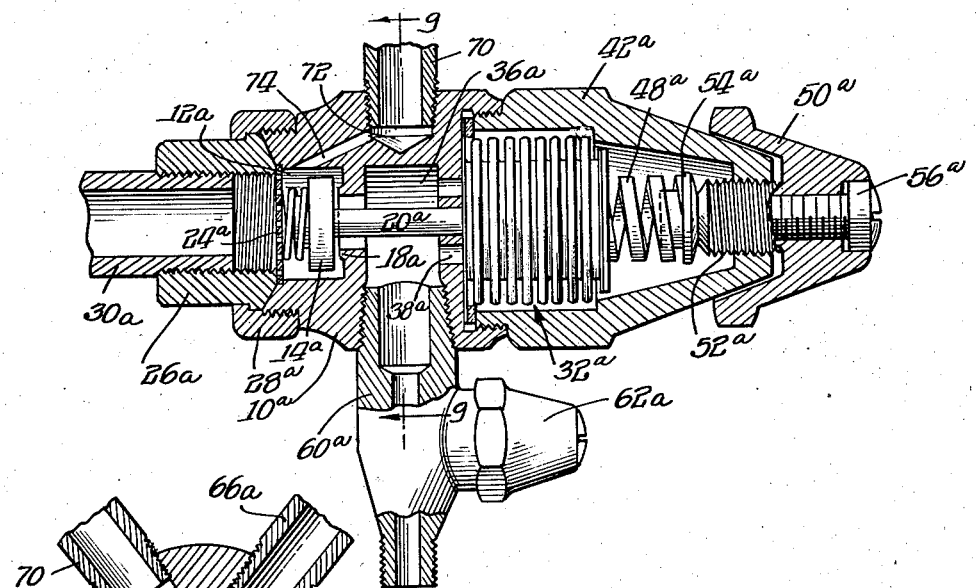
Figure 9:
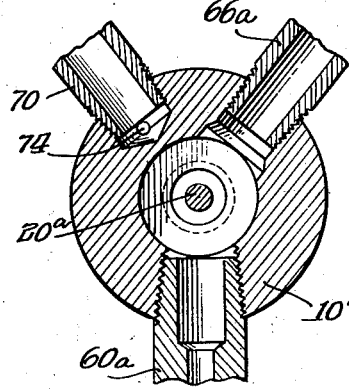

Fig. 8 is an enlarged central sectional view of the device shown in Figs. 6 and 7, said section being taken substantially along the line 8—8 of Fig. 2; and Fig. 9 is a vertical sectional view taken substantially along the line 9—9 of Fig. 8.

Referring now to the drawings wherein like numerals have been employed to designate similar parts throughout the various figures, it will be seen that one embodiment of the invention constitutes an air pressure regulator having a central body portion or housing 10. Within a chamber 12 at the left side of the body 10 (Fig. 3) is a valve member 14. This valve member is provided with a suitable sealing ring 16 which is adapted to engage a valve seat 18 when the valve member 14 is shifted to its extreme right position. The valve member 14 is centrally apertured to receive the left extremity of a stem 20. The extremity of the stem 20 makes a threaded coupling with the central portion of the valve member 14. A coil spring 22 is interposed between the valve member 14 and a screen or strainer disc 24 and thus continuously urges the valve member to the right, Fig. 3.

The valve head or member 14 and the cooperating valve seat 18 are relatively large so as to provide relatively large or non-restricted passage between the valve stem 20 and the walls of the valve port or passage. Thus a large volume of air may be supplied without excessive turbulence or high rate of flow.

The strainer 24 constitutes a relatively thin perforated disc and is firmly clamped in position between a shoulder provided by the body 10 and a coupling sleeve 26. This coupling sleeve 26 is clamped against the left extremity of the body 10 by means of a clamping collar 28. When the air regulator is in use it is coupled with a suitable air line illustrated by the fragmentary pipe or conduit 30 which is threaded within the coupling sleeve 26. Air or fluid under established air or fluid line pressure is introduced through the pipe 30 and thence through the strainer 24 which serves to prevent foreign matter from entering the chamber 12.

The spacing of the valve 14 from its complementary seat 18 is determined by the bellows device designated generally by the numeral 32 which is centrally contacted by the right extremity of the stem 20.

This bellows device includes a bellows 34 of the corrugated, expansible type, the left extremity of the bellows being in communication with the central chamber 36 of the body 10 through passages 38. The left extremity of the bellows 34 is provided with a laterally extending flange which is firmly clamped and sealed against the body 10 by a sealing ring 40 which is engaged by the left extremity of a bellows housing 42. The right extremity of the bellows 34 is closed by a cupped member 44 which is adapted to be urged to the right when air pressure is exerted within the bellows. The right extremity of the stem 20 contacts the central portion of the cup 44, said cup providing a central opening or recess 46 to accommodate the left extremity of a coil spring 48. The tension exerted by the coil spring 48 against the cup 44 and consequently against the bellows 34 is controlled by an adjustable cap or head 50. This cap 50 is formed with a screw section 52 which makes a threaded coupling with the right extremity of the tapered housing 42. Interposed between the inner extremity of the screw or shank portion 52 and the right end of the coil spring 48 is a cap 54. The central portion of the cap is slightly concave to facilitate self-centering of the cap with respect to the adjacent pointed extremity of the threaded section 52.

The cap 50 is adapted to be secured in various positions of adjustment through the agency of a screw member 56. The inner extremity of the screw member 56 is tapered in conformity with a complementary tapered surface provided within the threaded section 52, as clearly illustrated in Fig. 3. The threaded section 52 is formed with a transverse recess or slit 58 whereby when the complementary tapered or conical surfaces of the screw 50 and the threaded member 52 are engaged the bifurcated sections of the member 52 will have a tendency to spring outwardly and thereby lock the complementary thread convolutions of the member 52 against the thread convolutions of the housing 42.

Air or fluid under pressure from the chamber 36 within the body 10 is distributed through nipples or couplings 60. Each coupling 60 is provided with a rotary valve 62. In the described embodiment the body 10 is formed to accommodate at least three distributing couplings or valves. In Fig. 1, one of the couplings has been removed for the purpose of more clearly illustrating structure otherwise hidden. In Fig. 2, the manner in which three coupling members may be attached to the body 10 is clearly disclosed. A suitable pressure gauge 64 communicates with the chamber 36 through a pipe connection 66.

It will be apparent from the foregoing description that the cap 50 may be adjusted so as to permit the sealing of the valve member 14 against the seat 18 when the air pressure within the chamber 36 reaches a predetermined value. Thus, air under a given pressure, for example, air from a compressor (not shown) may be delivered from the pipe line 30 through the filter or strainer 24 into the chamber 12 and thence into the chamber 36, depending upon the position of the valve member 14. The coil spring 48 being pretensioned to yield in response to movement experienced by the bellows, when a predetermined pressure within the chamber 36 has been established, enables the closing of the valve member 14 against the seat 18 the instant that the pressure within the chamber 36 tends to rise above a predetermined point. Thus, a given pressure within the air line may be reduced to a desired lower pressure and maintained at that desired pressure within the chamber 36. Air or fluid at this desired reduced pressure may be directed through the couplings 60 to air-operated devices.

In Figs. 6 to 9, inclusive, a modified form of regulator is disclosed. The regulator shown in these figures is similar in functional characteristics to the regulator shown in Figs. 1 to 5, inclusive, but there are certain structural differences. Inasmuch as most of the structural features in the two regulators are identical, like numerals have been employed to denote the similar structural features, the suffix $a$ being added to the numerals used in Figs. 6 to 9, inclusive. A detailed description of the valve and the bellows control therefor is not necessary because these elements are identical in both designs. It will suffice to state that the regulator shown in Figs. 6 to 9, inclusive, is equipped with two pressure gauges, one designated by the numeral 64a which corresponds with the pressure gauge 64 previously described, and another designated by the numeral 68. The gauge 64a like the gauge 64 is connected with the chamber 36a through a pipe connection 66a and thus serves to indicate the reduced pressure conditions in said chamber. The pressure gauge 68 is connected through the agency of a pipe 70, an opening 72 and a passage 74 with the chamber 12a and thus serves to indicate pressure within the supply line 30a. By having this arrangement the two pressure conditions may be observed simultaneously. It will also be noted that the three couplings 60a are provided with valves 62a which differ structurally but not functionally from the valves 62 previously described. The valves 62a are protected against breakage by employing a rotary cap which corresponds structurally with the cap 50 previously described.

The novel features of construction heretofore described present an air pressure regulator of improved practical design. The use of a controlling mechanism incorporating the pressure responsive bellows, as previously described, constitutes a distinct advancement over conventional types of diaphragm control devices with which I am familiar and which I have heretofore made. The bellows permits of a greater range of valve movement and materially increases the operating capacity of the device. It will also be noted that all of the operating elements are very compactly arranged within a housing structure with a minimum number of constituent elements, and that there are no unsightly adjusting screws or the like projecting from the housing. In fact, the entire operating mechanism is compactly shielded within a housing structure and yet is susceptible to sensitive adjustment with a minimum amount of effort and skill on the part of an operator. By having both the air chamber 36a connected with the gauge 64a and the chamber 12a connected with the gauge 68, it is possible to simultaneously observe pressure conditions in the supply line and in the lines coupled with the parts to be operated, such as sprayers and the like. This constitutes a distinct advancement over prior devices with which I am familiar wherein the simultaneous observance of the two pressure conditions is not possible.

In the drawings a specific embodiment of the invention has been disclosed but it will be apparent that the invention is not limited to this specific disclosure but is capable of other variations coming within the scope of the claim appended hereto.

The invention is hereby claimed as follows:

A fluid pressure regulator comprising a housing structure having a hollow body and transverse walls forming in axial alignment a high pressure chamber and a low pressure chamber, a first, detachable hollow fitting secured to said structure at one end thereof to form, with a transverse wall of the structure, a bellows receiving chamber in linear alignment with the pressure chambers, said housing structure also having an outlet chamber offset from the low pressure chamber but in fluid communication therewith, a second, detachable hollow fitting secured to the other end of said structure to form an inlet chamber in linear alignment with the pressure chambers and the bellows receiving chamber, the wall between the high pressure chamber and the low pressure chamber having a relatively large opening therein forming a valve passage, a valve stem slidably mounted in the wall between the low pressure chamber and the bellows receiving chamber, said valve stem extending through the low pressure chamber and passing freely through said valve passage into said high pressure chamber, a disk valve mounted on said stem in said high pressure chamber to open and close said passage as the stem is moved in one direction or the other, a removable, perforated disk secured by said inlet chamber fitting at one end of said high pressure chamber, a valve closing spring bearing at one end against said perforated disk and at the other end against said disk valve to urge said valve and stem to closed position, the wall between the low pressure chamber and the bellows receiving chamber having passages therethrough and offset with respect to the axis of the valve stem for establishing fluid communication between the low pressure chamber and the bellows receiving chamber, a pressure responsive valve controlling bellows in the bellows receiving chamber, said valve stem projecting into said bellows from one end thereof, a cylinder closed at one end and having an external flange at the other end, said cylinder projecting into said bellows from the end opposite said valve stem and bearing at its closed end against the valve stem, the external flange of the cylinder abutting against the end of the bellows remote from the valve stem, the other end of the bellows being secured by the first fitting against the wall between the low pressure chamber and the bellows receiving chamber, the first fitting having an opening through its outer end wall thereof in linear alignment with said valve stem, an adjustable cap member rotatably mounted on said first fitting externally thereof and having a central stud portion projecting through said last mentioned opening, a spring bearing against the stud within said bellows receiving chamber and projecting into said cylinder to bear against the closed end thereof, said stud being split longitudinally and having an internal bore provided with a conical portion, a locking screw mounted in said cover member and having a tapering end portion engaging said conical portion of the bore in said stud to spread and wedge said stud against the opening in the bellows receiving chamber thereby to lock said cover member in adjusted position.

JENS A. PAASCHE.